Figure 1:
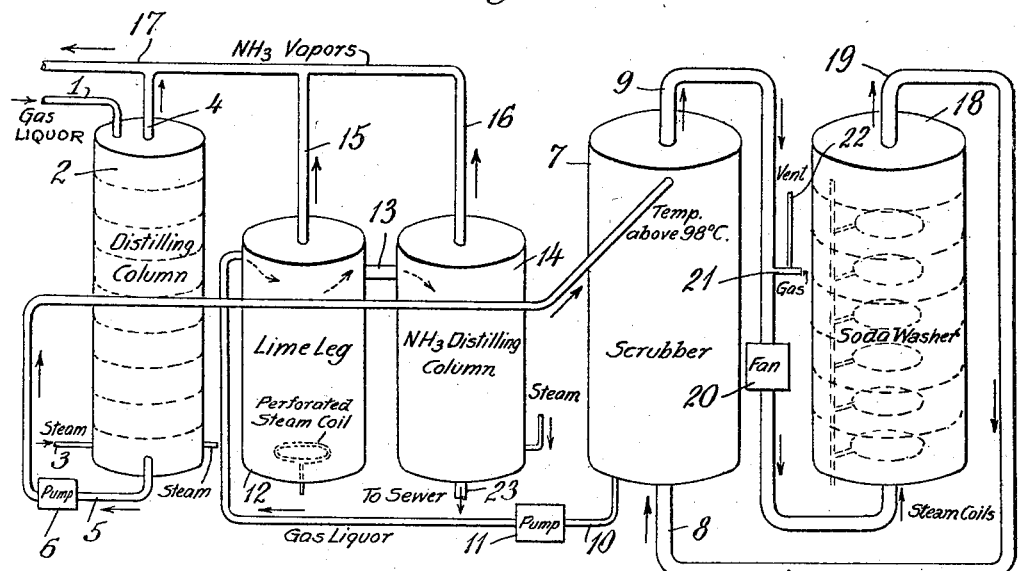

Sept. 20, 1932.         W. TIDDY         1,878,979

REMOVING PHENOLS FROM GAS LIQUOR

Filed July 20, 1928

William Tiddy INVENTOR

BY
Pennie Davis Marvin Edmonds
ATTORNEYS

Patented Sept. 20, 1932

1,878,979

UNITED STATES PATENT OFFICE

WILLIAM TIDDY, OF JEFFERSONVILLE, PENNSYLVANIA, ASSIGNOR, BY MESNE ASSIGNMENTS, TO THE KOPPERS COMPANY OF DELAWARE, OF PITTSBURGH, PENNSYLVANIA, A CORPORATION OF DELAWARE

REMOVING PHENOLS FROM GAS LIQUOR

Application filed July 20, 1928. Serial No. 294,236.

This invention relates to improvements in the elimination of phenols from ammoniacal gas liquors and comprises a process in which the phenol is removed separately from the ammonia.

According to the present invention, ammoniacal gas liquor is first subjected to distillation to remove therefrom substantially all of the free ammonia which the liquor contains; the resulting hot gas liquor is then subjected to scrubbing while at a temperature of around 98° C. or higher with an inert gas to remove phenols from the liquors; and the remaining liquor with its fixed ammonia is then treated with lime and subjected to further distillation to set free the fixed ammonia and remove it therefrom.

In United States Patent No. 1,566,796 there is described the removal of phenols from ammoniacal liquor by passing the ammoniacal liquor through a free ammonia still, then through a scrubber, and then through the fixed ammonia still, with maintenance of a temperature around 98° C. or higher in the stills and scrubber and with passage of ammonia from the still through the scrubber to assist in the removal of phenol from the liquor.

In the process of the present invention the ammoniacal liquor is first freed from free ammonia with substantial completeness before it is subjected to scrubbing to remove the phenol therefrom, and the scrubbing is carried out with substantial absence of free ammonia and with the circulation through the hot liquor of an inert gas such as steam, air or other gases which are inert so far as the phenol is concerned. The phenol is therefore driven off in a form substantially free from admixed ammonia and ammonium phenylate. The phenol vapors admixed with the inert gases are passed through an absorbent for the phenol such as a caustic soda washer maintained at a high temperature and the inert gas freed from phenol can advantageously be returned to the scrubber in a cyclic manner. By freeing the ammoniacal liquor from free ammonia before it is subjected to scrubbing, and by employing an inert gas for the scrubbing, the inert gas is kept free from ammonia and ammonia does not build up in it as would be the case if the liquor entering the scrubber still contained free ammonia.

From the scrubber the liquor from which the phenol has been removed but which still contains fixed ammonia is passed to the fixed ammonia still where it is treated with lime and the fixed ammonia decomposed and the resulting free ammonia removed and recovered. In the ordinary ammonia still the ammonia set free in the fixed ammonia still enters the bottom of the free ammonia still and passes upwardly therethrough, escaping admixed with the free ammonia from the free ammonia still. In such case, however, the ammoniacal liquor drawn off from the bottom of the free ammonia still will contain approximately the same content of free ammonia as the ammoniacal liquor entering the free ammonia still; and, if such liquor were passed to the scrubber, ammonia would be driven off with the phenol. This is avoided in the present process by freeing the liquor with substantial completeness from free ammonia before it passes to the scrubber.

The invention will be further described in connection with the accompanying drawing, which illustrates in a conventional and diagrammatic manner an arrangement of apparatus embodying the invention and adapted for the practice of the process of the invention.

Figure 2:
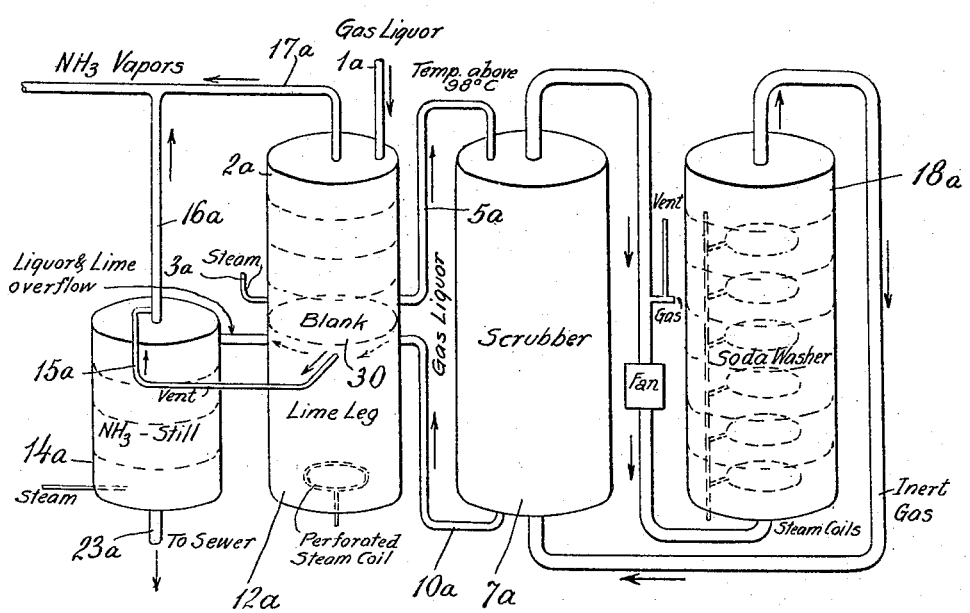

In the accompanying drawing Figures 1 and 2 show in the form of flow sheets or diagrammatic arrangements apparatus which comprises a free ammonia still, a scrubber, a fixed ammonia still, a soda washer, and means for drawing off ammonia vapor independently from the free and fixed ammonia stills and for circulating the liquor from the free ammonia still to the scrubber and thence to the fixed ammonia still, together with means for recovering phenols from the gases escaping from the scrubber.

Referring first to Fig. 1, the gas liquor enters through the gas liquors inlet pipe 1, to the distillation column or free ammonia still 2 where all or substantially all of the free ammonia is driven off. This still is heated by the introduction of live steam at 3. The ammonia escapes in gaseous form through the outlet pipe 4. During its passage through this distilling column or free ammonia still the liquor is heated to a temperature of around 98° C. or higher. It then passes by means of the line 5 and pump 6 to an insulated scrubber 7 where it meets a countercurrent flow of steam, air or other inert gases or mixtures thereof entering through the pipe 8 in sufficient quantity to remove the phenolic compounds from the gas liquor with substantial completion or to the desired extent. The inert gases carrying the phenol vapors escape through the outlet pipe 9. The liquor leaving the scrubber 7 passes by means of the pipe 10 and pump 11 to the top of the lime leg 12 where it is treated with lime and the fixed ammonium salts are decomposed, the liquor then flowing through the connection 13 to the fixed ammonia still 14 in which the liquor is further heated and from which the last of the ammonia is driven off. Outlet pipes for the ammonia from the lime leg and fixed ammonia still are shown at 15 and 16, and lead to the same outlet pipe 17 with which the ammonia pipe 4 from the free ammonia still 2 connects. The ammonia from the free ammonia still, the lime leg and the fixed ammonia still is thus taken off separately and the vapors then combined. The ammonia gas from the lime leg and the fixed ammonia still do not, as in present day practice, pass to the bottom of the free ammonia still. Accordingly, the liquor leaving the bottom of the free ammonia still and going to the scrubber 7 will be free or substantially so from free ammonia but it will contain the normal content of fixed ammonia.

The inert gases containing phenol vapors removed from the gas liquor in the scrubber pass through the outlet pipe 9 to the bottom of a countercurrent insulated phenol absorbent 18 where the phenol is recovered while allowing the inert gases practically freed from phenol to escape through the outlet pipe 19 and to be recirculated through the scrubbers for treatment of the additional gas liquor. A fan 20 located in the pipe 19 keeps the inert gases in circulation. A gas pipe 21 permits additional inert gas to be introduced and a vent pipe 22 permits any excess pressure in the system to be relieved. The phenol absorber may contain a strong solution of caustic soda with steam coils for heating so as to maintain it at a high temperature particularly where steam is employed as the inert gas. The scrubber 7, phenol absorber 18 and all connecting piping are heat insulated to maintain a high temperature of the liquor and absorbing liquid. The temperature is maintained throughout the circulating system so that no appreciable condensation takes place, thus making it possible to have a continuous cycle of steam, air or other inert gases or mixtures for the elimination process.

In the apparatus of Fig. 2 the corresponding parts are indicated by the same reference characters as in Fig. 1 with the reference character "a" appended thereto. In this arrangement the free ammonia still 2a, the lime leg 12a and the fixed ammonia still 14a are arranged in similar relation to each other as in present day construction, but an imperforate partition 30 is interposed between the free ammonia still and the lime leg so that ammonia from the lime leg and fixed ammonia still cannot pass up through the liquor in the free ammonia still; and the lime leg and fixed ammonia still are provided with separate outlet pipes 15a and 16a for the ammonia. In addition a steam inlet 3a is provided at the bottom of the free ammonia still 2a to insure heating and freeing of the liquor from its free ammonia.

The operation of the apparatus of Fig. 2 is similar to that of Fig. 1. The gas liquor enters through the gas liquor pipe 1a to the free ammonia still 2a and is heated therein by the introduction of live steam directly into the liquor through the line 3a. The free ammonia is driven out of the liquor with substantial completeness so that the liquor passing through the line 5a to the scrubber 7a has been freed with substantial completion from free ammonia. After the removal of phenols in the scrubber 7a the liquor returns through the line 10a to the lime leg 12a and the fixed ammonia still 14a, where the fixed ammonia is set free and separately taken off through separate outlet connections without being permitted to enter the liquor in the bottom of the free ammonia still.

In the operation of the process the temperature of the ammonia vapors escaping from the top of the free ammonia still can be kept sufficiently low so that little if any phenol escapes therewith, but the liquor is heated in the free ammonia still to a temperature sufficiently high so that when it enters the scrubber it will be preheated to a temperature around 98° C. or higher, which temperature is required for effective driving off of phenol by the inert gases employed.

The phenol is thus driven off separately from the ammonia and vice versa; and in particular the phenol is driven off in an ammonia-free state from liquor which has been freed from free ammonia but which still contains combined ammonia. This removal of phenols before the removal of combined ammonia has the important advantage that the waste liquor leaving the still through the outlets 23 and 23a is substantially freed from phenols where the phenols are completely removed by the scrubbing operation. When phenols are present in the liquor in the fixed ammonia still they combine with lime to form calcium phenylate which is difficult to remove.

It will thus be seen that the present invention provides for the separate and independent removal and recovery from gas liquor of ammonia which may be substantially free from phenols and of phenol substantially free from ammonia; and that the phenol removal step follows the removel of free ammonia with substantial completeness and precedes the removal of fixed ammonia, while the free ammonia and fixed ammonia are separately taken off from the free and fixed ammonia stills.

In order to prevent the presence of free ammonia in the circulating inert gas of the phenol removal and recovery system, and the building up of ammonia in the system, it is important that the free ammonia still should be operated to accomplish substantially complete distillation of free ammonia from the liquor and that the ammonia from the lime leg and fixed ammonia still be taken off separately and not permitted to pass upwardly through the liquor in the free ammonia still as in present day practice.

I claim:

1. The improvement in the treatment of ammoniacal gas liquor, which comprises subjecting the same to distillation to remove free ammonia therefrom with substantial completeness, passing the resulting liquor from which free ammonia has been substantially completely removed while at a temperature around 98° C. or higher to a scrubber and passing an ammonia free gas through the hot liquor to remove phenols from the liquor, returning the liquor after the removal of phenols to a fixed ammonia still and there treating it with lime to set free the fixed ammonia, and recovering the ammonia so set free.

2. The improvement in the treatment of ammoniacal gas liquor, which comprises subjecting the liquor to distillation and introducing steam directly into such liquor to effect substantially complete removal of free ammonia therefrom, passing the resultant liquor while at a temperature around 98° C. or higher to a scrubber and maintaining it at such temperature therein while passing ammonia-free gas counter-current thereto to remove phenols therefrom, passing the resulting liquor, after the removal of phenols, to a separate ammonia still and treating the same with lime to set free fixed ammonia, and separately withdrawing such ammonia.

3. The improvement in the treatment of ammoniacal gas liquor, which comprises subjecting the same to distillation in a free ammonia still with steam to substantially completely remove free amonia therefrom, passing the resulting ammonia-free liquor while at a temperature around 98° C. or higher to a scrubber and passing ammonia-free gas through the hot liquor to remove phenols from the liquor, treating the thereby dephenolized liquor with lime to set free the fixed ammonia, distilling the limed liquor with steam in a fixed ammonia still to remove the ammonia thus set free, and by-passing the ammonia vapors from said fixed ammonia still around said free ammonia still.

4. The improvement in the process of treating ammoniacal gas liquor, which, when carried out in apparatus comprising a free ammonia still, a scrubber, a lime leg and a fixed ammonia still, comprises passing said liquor through said free still in countercurrent to a flow of steam for the substantially complete removal of free ammonia therefrom, then treating the thus distilled liquor at a temperature around 98° C. or higher in said scrubber with a current of substantially inert gas to remove phenol therefrom, then treating the liquor from which free ammonia and phenol have been removed in said lime leg for the conversion of ammonia originally present in fixed form to free ammonia, then passing the limed liquor through the fixed still in countercurrent to a flow of steam for the removal of ammonia originally present in fixed form, removing the ammoniacal vapors liberated in said fixed still and commingling them with ammoniacal vapors produced in said free still at a point removed from the points of introduction of steam into, and removal of liquor from, said free still.

5. The improvement in the process of treating ammoniacal gas liquor, which, when carried out in apparatus comprising a free ammonia still, a scrubber, a lime leg and a fixed ammonia still, comprises passing said liquor through said free still in countercurrent to a flow of steam for the substantially complete removal of free ammonia therefrom, then treating the thus distilled liquor at a temperature around 98° C. or higher in said scrubber with a current of substantially inert gas to remove phenol therefrom, then treating the liquor from which free ammonia and phenol have been removed in said lime leg for the conversion of ammonia originally present in fixed form to free ammonia, then passing the limed liquor through the fixed still in countercurrent to a flow of steam for the removal of ammonia originally present in fixed form, and separately removing ammoniacal vapors liberated in said free still and in said fixed still.

In testimony whereof I affix my signature.

WILLIAM TIDDY.